3,169,096
PHOSPHATE DENTIFRICE

Julian R. Schlaeger, Chicago Heights, and Lowell E. Netherton, Park Forest, Ill., assignors to Stauffer Chemical Company, New York, N.Y., a corporation of Delaware No Drawing. Original application June 30, 1959, Ser. No. 823,822, now Patent No. 3,066,056, dated Nov. 27, 1962. Divided and this application Jan. 15, 1962, Ser. No. 166,394

2 Claims. (Cl. 167—93)

This invention relates to stabilized dicalcium phosphate dihydrate compositions containing controlled proportions of in situ formed calcium pyrophosphate and added sodium-calcium pyrophosphate, dentifrice compositions containing said stabilized dicalcium phosphate dihydrate compositions, and methods of producing same.

This application is a division of our prior copending application, Serial No. 823,822, filed on June 30, 1959, now U.S. Patent 3,066,056.

Dicalcium phosphate dihydrate is a highly desirable abrasive component for use in dentifrice formulations because of its mild abrasive characteristics with respect to tooth enamel. However, because of its instability against dehydration, it is not entirely satisfactory for use in many dentifrice compositions. Partial or complete dehydration of the dicalcium phosphate dihydrate in either powdered or paste type dentifrice formulations results in undesirable variations in the abrasion and other physical characteristics of these formulations. For example, when used in dentifrice paste formulations containing water and a humectant such as glycerine or sorbitol, there is a tendency for the dicalcium phosphate dihydrate to become partially dehydrated on aging, thereby causing the paste to become gritty or stiffen, or even set to form a hard non-extrudable mass.

Considerable effort has been made in the past to stabilize the dicalcium phosphate dihydrate for use in dentifrice formulations. However, these efforts have met with only limited success, particularly in its use in paste type formulations such as the currently popular paste formulations which include such gums as carboxymethyl cellulose and additives (e.g. sarcosinates, etc.) which provide these formulations with increased hygienic properties.

We have now found that the above difficulties may be substantially overcome by the combined use of controlled levels of in situ formed calcium pyrophosphate and finely divided calcium-sodium pyrophosphate additives in conjunction with dicalcium phosphate dihydrate. This combination of additives renders the dicalcium phosphate dihydrate stable against dehydration under normal storage conditions, gives it the ability to provide a suitable viscosity to toothpastes employing various humectants (e.g., glycerine and/or sorbitol), and stabilizes paste type dentifrice formulations containing dicalcium phosphate dihydrate against changes which occur upon aging (e.g., changes in viscosity and gel strength).

It has been found that control of these characteristics may be effected by the introduction of from about 0.4% (or at least 0.16% $H_4P_2O_7$) to about 0.8% by weight (based on the weight of the final stabilized dihydrate) of pyrophosphoric acid (at least 40% $H_4P_2O_7$) in the process of manufacturing the dicalcium phosphate dihydrate plus the addition of about 0.6% to about 1.2% by weight (based on the weight of the final stabilized dihydrate) of previously prepared, finely divided sodium-calcium pyrophosphate to the finished, finely divided, pyrophosphoric acid modified dicalcium phosphate dihydrate crystals. Both additions are essential to our invention since neither of these treatments alone produce a dicalcium phosphate dihydrate composition having the above desired characteristics.

Examples I–III, infra, show that the controlled addition of both pyrophosphoric acid and sodium-calcium pyrophosphate to dicalcium phosphate dihydrate causes both additives to synergistically provide the dihydrate with enhanced stability against dehydration upon storage at about 60° C. at a relative humidity of about 75%. Similarly, Example IV, infra, shows that this combination of constituents synergistically causes the dicalcium phosphate dihydrate to have enhanced stability against dehydration in a glycerin-water solution. Example V, infra, illustrates the control of the viscosity of toothpaste over a rather wide range with dicalcium phosphate dihydrate constituents which include in-process added pyrophosphoric acid and mechanically added calcium-sodium pyrophosphate in the same proportions that control the stability of the dicalcium phosphate dihydrate against dehydration. Example VI, infra, illustrates the procedure that may be used for producing our stabilized dicalcium phosphate dihydrate.

Determinations of stability of the dihydrate against dehydration may be made by placing 10 grams of the dicalcium phosphate dihydrate product (modified or unmodified) in a 2½ inch diameter moisture pan and holding the pan in a humidor in an atmosphere of 75% relative humidity and at a temperature of about 60° C. for periods ranging from one to thirteen days. The amount of dehydration may be obtained by determining the loss on ignition after drying in a calcium chloride containing desiccator for one to two hours at room temperature. By comparison with an original sample, the difference in loss may be calculated as percent conversion to the anhydrous salt. The stability data of Examples I–III, infra, were obtained in this manner.

EXAMPLE I

In order to prepare dicalcium phosphate dihydrate, a weighed quantity of orthophosphoric acid may be diluted with sufficient water to adjust the solution to about 15° Bé. strength. To this solution, a milk of lime slurry of about 8° to 10° Bé. strength may be added with rapid stirring at a rate sufficient to maintain the charge at a temperature within the range of about 35° to 45° C. The addition of milk of lime should be continued so as to complete the neutralization and precipitation of dicalcium phosphate dihydrate crystals and produce a mother liquor having a pH of about 7. The dicalcium phosphate dihydrate product may then be filtered out and dried to produce a product having particles smaller than about 40 microns in diameter.

One percent by weight of finely divided sodium-calcium pyrophosphate ($CaNa_2P_2O_7 \cdot 4H_2O$) should be mechanically mixed with dicalcium phosphate dihydrate that was produced in accordance with the above-described procedure. This product is unstable because about 66% by weight of the dicalcium phosphate dihydrate converted to anhydrous dicalcium phosphate upon storage for one day at 60° C. in an atmosphere of about 75% relative humidity.

EXAMPLE II

As pointed out in Example I above, dicalcium phosphate dihydrate may be prepared by first diluting a weighed quantity of orthophosphoric acid with sufficient water to adjust the solution to about 15° Bé. strength. To this solution a milk of lime slurry of about 10° Bé. strength may be added with rapid stirring at a rate sufficient to maintain the charge at a temperature within the range of 35° to 45° C. The reaction may be permitted to continue until the pH value of the liquor is about 5–6. At this point, 0.4% by weight pyrophosphoric acid should be added to the reaction mixture. The addition of the milk of lime should be continued to complete the neutralization and precipitation of the dicalcium phosphate dihydrate crystals and produce a mother liquor having a pH of about 7. The pyrophosphoric acid modified dicalcium phosphate dihydrate may then be filtered out and dried to produce a product having particles smaller than about 40 microns in diameter. The product is unstable as evidenced by the conversion of the 44% by weight of the dicalcium phosphate dihydrate to anhydrous dicalcium phosphate upon storage for six days at the test conditions set forth in Example I, supra.

EXAMPLE III

On the other hand, when the same levels of sodium-calcium pyrophosphate and pyrophosphoric acid of Examples I and II, respectively, are both added in accordance with the procedures set forth in these examples, the resulting product is significantly more stable than the products produced by Examples I and II. Only 5% by weight of the dicalcium phosphate dihydrate converted to the anyhydrous form upon storage for ten days at the test conditions set forth in Example I, supra.

Example IV, infra, shows that the product of Example III, supra, in glycerin-water solutions, is superior to the products of Examples I and II, supra.

EXAMPLE IV

Stability determinations of the dicalcium phosphate dihydrate in glycerin-water solutions were made by placing 25 grams of the dicalcium phosphate dihydrate sample in a 100 ml. glass beaker and adding increments of an 80% to 20% glycerin-water solution, with stirring, until a thin paste was formed. The consistency of the paste was determined by drawing a glass rod across the surface, thereby making a track which disappeared within a few seconds. The paste was then poured into a Pyrex test tube and suspended in boiling water (i.e., 100° C.) for 30 minutes. The slurry was then thinned with methanol and filtered, and further washed with methanol to remove all glycerin from the dicalcium phosphate residue. The residue was allowed to dry at room temperature. The loss on ignition was then determined. By comparing this loss with the original sample, the difference in loss is calculated as percent conversion to the anyhdrous form.

Sixty-four percent by weight of the dicalcium phosphate dihydrate (this of course excludes the additives) converted to the anhydrous form when the product of Example I, supra, was added to the glycerin-water solution for ½ hour at 100° C.

Fifty-two percent by weight of the dicalcium phosphate dihydrate converted to the anyhdrous form when the product of Example II, supra, was added to the glycerin-water solution for ½ hour at 100° C.

Only 13% by weight of the dicalcium phosphate dihydrate converted to the anyhdrous form when the product of Example III, supra, was added to the glycerin-water solution for ½ hour at 100° C.

Example V, infra, shows that dicalcium phosphate dihydrate containing either in-process added pyrophosphoric acid or mechanically added calcium-sodium pyrophosphate results in increasing the viscosity of the toothpastes used as the level of the additives in the dicalcium phosphate dihydrate component increases, with the effect of the in-process added pyrophosphoric acid causing the more rapid rise in viscosity. The calcium-sodium pyrophosphate additive has a modifying effect on the rate of the increase of viscosity when used in amounts of up to about 1.25% by weight of the dicalcium phosphate dihydrate employed in the paste. Thus, the modifying effect of the calcium-sodium pyrophosphate additive is much less pronounced in pastes in the higher viscosity range, namely, in the order of 700,000 centipoises or higher. Example V thus demonstrates the control of toothpaste viscosity over a wide range with dicalcium phosphate dihydrate compositions containing in-process added pyrophosphoric acid and mechanically added calcium-sodium pyrophosphate in proportions which are within the range suitable for controlling the stability of the dicalcium phosphate dihydrate against dehydration.

EXAMPLE V

In order to illustrate the effect of our combination of additives upon the viscosity of toothpastes containing dicalcium phosphate dihydrate, sorbitol and carboxymethyl cellulose, viscosity studies were made with Formulation A, infra.

Paste Formulation A

| | Percent, by weight |
|---|---|
| Dicalcium phosphate dihydrate constituent (i.e., modified or unmodified dihydrate) | 46.3 |
| Sorbitol | 25.0 |
| Carboxymethyl cellulose (as gum) | 1.0 |
| Flavoring agents | 1.0 |
| Water | 24.8 |
| Sodium lauryl sulfate | 1.8 |
| Saccharin | 0.1 |

The viscosity measurements were made using a Brookfield Synchro-Lectric Viscometer (Multi-Speed Model HAF). Each reported measurement represents the average of five separate measurements. The viscosity readings were converted to centipoises to give the values reported.

It was found that the viscosities of pastes of the above type may be essentially controlled by controlling the proportions of the calcium-sodium pyrophosphate and pyrophosphoric acid employed. For example, the inclusion of 0.4% by weight in-process added pyrophosphoric acid and 0.6%, 1.0% and 1.2% by weight mechanically mixed in calcium-sodium pyrophosphate in the dicalcium phosphate dihydrate constituent of Formulation A caused Formulation A to have viscosity values of 260,000, 480,000, and 700,000 centipoises, respectively, after aging for ten days. When the dicalcium phosphate dihydrate constituent of Formulation A contained mechanically mixed in calcium-sodium pyrophosphate, and no pyrophosphoric acid, in amounts of 0.6% to 1.2% by weight, the formulation had viscosity values ranging from 100,000 to only 370,000 centipoises after fourteen days.

Our stabilized dicalcium phosphate dihydrate product also improves toothpastes formulated with humectants such as glycerine and mixtures of glycerine and sorbitol. Formulation B illustrates an example of this type of formulation:

Paste Formulation B

| | Percent by weight |
|---|---|
| Dicalcium phosphate dihydrate constituent (i.e., modified or unmodified constituent) | 50.0 |
| Glycerin | 4.0 |
| Sorbitol | 20.0 |
| Irish moss (as gum) | 1.0 |
| Water | 23.1 |
| Sodium lauryl sulfate | 1.8 |
| Saccharin | 0.1 |

It was found that with pastes such as Formulation B, the use of dicalcium phosphate dihydrate constituents containing 0.4%, 0.6%, and 1.25% by weight, respectively, of in-process added pyrophosphoric acid, caused the resulting pastes to have viscosity values of 236,000, 310,000, and 850,000 (a stiff paste) centipoises after aging for fourteen days.

Still further, our additives improve toothpaste formulations of the type shown in Formulation B, supra, wherein about 7% sorbitol and about 21% glycerin are used. When the dicalcium phosphate dihydrate constituent in this type of formulation contains 1.25% by weight in-process added pyrophosphoric acid and 0.6% mechanically mixed in calcium-sodium pyrophosphate, the paste has a viscosity of about 500,000 centipoises after fourteen days, as compared with about 249,000 centipoises which is obtained when the dihydrate constituent includes 0.4% by weight in-process added pyrophosphoric acid and 0.9% by weight calcium-sodium pyrophosphate.

Under accelerated test conditions, increasing the amount of in-process added pyrophosphoric acid to 0.8% by weight of the dicalcium phosphate dihydrate produces a stabilized product; a product in which only 3% by weight of the dicalcium phosphate dihydrate is converted to the anhydrous form on storage for ten days at 60° C. in an atmosphere of 75% relative humidity, using the test procedure set forth above with respect to Examples I–III. No further increase in the stability was effected by the addition of 1.2% by weight of calcium-sodium pyrophosphate to the 0.8% by weight pyrophosphoric acid modified product. Larger amounts of the two additives do not further improve appreciably the stability of the dicalcium phosphate dihydrate against dehydration under equivalent test conditions. Thus, the upper limit for the synergistic effect of the two additives upon the stability of the dicalcium phosphate dihydrate against dehydration is about 0.8% by weight in-process added pyrophosphoric acid and about 1.2% by weight mechanically mixed in calcium-sodium pyrophosphate. With lower amounts of the in-process added pyrophosphoric acid, stability decreases rapidly. For practical purposes, the use of about 0.4% by weight in-process added pyrophosphoric acid and about 0.6% by weight mechanically added calcium-sodium pyrophosphate represents the minimum desired levels of the two additives for commercial purposes.

An example of the method of preparing our new stabilized dicalcium phosphate dihydrate composition may be illustrated as follows:

EXAMPLE VI

A weighed quantity of orthophosphoric acid was diluted with sufficient water to adjust the solution to about 15° Bé. strength. To this solution, a milk of lime slurry of about 8° to 10° Bé. strength was added with rapid stirring at a rate sufficient to maintain the charge at a temperature within the range of 35° to 45° C. The course of the reaction was permitted to continue until the pH value of the charge liquor was within the range of 5.0 to 6.5 (a pH of 6 is preferred). At this point, from 0.4% to 0.8% by weight of pyrophosphoric acid (40% to 50% by weight $H_4P_2O_7$ content) based on the weight of the calculated stoichiometric quantity of dicalcium phosphate dihydrate equivalent of the phosphoric acid in the charge was added. The addition of the milk of lime was then continued to complete the neutralization and precipitation of the dicalcium phosphate dihydrate crystals from a mother liquor having a pH value of about 6.9 to 7.2 (preferably about 7.1). The pyrophosphoric acid modified dicalcium phosphate dihydrate product was filtered out and dried. The product may be milled to produce a product substantially all of which has a particle size smaller than 40 microns in diameter.

From 0.6% to 1.2% by weight of a substantially water-insoluble, finely divided calcium-sodium pyrophosphate ($CaNa_2P_2O_7 \cdot 4H_2O$) was added and the materials thoroughly mixed to effect a homogenous distribution of the sodium-calcium pyrophosphate throughout the dicalcium phosphate dihydrate product. The final product had a pH within the range of 7.0 to 7.7.

It is not known in what form the added pyrophosphoric acid appears in the final product, but presumably the acid is neutralized to calcium pyrophosphate in the final stages of the manufacturing procedure with the calcium pyrophosphate being coprecipitated or adsorbed on the surfaces of the dicalcium phosphate dihydrate crystals. It is important that the pyrophosphoric acid be added prior to the final neutralization with lime.

The term "pyrophosporic acid" is intended to include mixtures of polyphosphoric acids containing at least 40% by weight of pyrophosphoric acid ($H_4P_2O_7$), preferably 40% to 50% by weight $H_4P_2O_7$, as evidenced by chromatographic analysis. The pyrophosphoric acid employed in the above examples was produced by the reaction of $P_2O_5$ with an amount of water stoichiometrically equivalent to 2 moles of water per mole of $P_2O_5$.

The calcium-sodium pyrophosphate employed in our invention may be made by well-known means. For example, a dilute solution of a sodium pyrophosphate may be reacted with a dilute milk of lime or soluble calcium compound and the resulting precipitate of $$CaNa_2P_2O_7 \cdot 4H_2O$$

filtered, washed, and dried. If necessary, the product may be milled to a particle size of less than 40 microns.

In the reaction for the production of the dicalcium phosphate dihydrate, the in-process added pyrophosphoric acid should be neutralized by the final addition of milk of lime. Calculations indicate that when 0.4% by weight pyrophosphoric acid containing 40% $H_4P_2O_7$ (by chromatographic analysis) is added to the reaction mixture, the $Ca_2P_2O_7$ content of the final product should be about 0.23% by weight. On the other hand, when 0.8% by weight pyrophosphoric acid containing 50% $H_4P_2O_7$ (by chromatographic analysis) is used, the resulting product should contain about 0.57% $Ca_2P_2O_7$.

For purposes of the present invention and the following claims, the minimum level of $H_4P_2O_7$ used is intended to be 0.16% by weight based on the dihydrate, which results when 0.4% pyrophosphoric acid contains 40% $H_4P_2O_7$.

The term "intimately bonded" in the claims refer to intimately bonded product that results when pyrophosphoric acid is added to the dicalcium phosphate dihydrate reaction mixture prior to its complete neutralization and prior to the completion of the formation of the dihydrate crystals.

The percentages of pyrophosphoric acid and sodium-calcium pyrophosphate are herein based on the final or total weight of the stabilized dihydrate product (includes the dihydrate plus these additives).

The foregoing detailed description has been given for clearness of understanding only, and no unnecessary limitations should be understood therefrom, as modifications will be obvious to those skilled in the art.

We claim:

1. A dentifrice paste composition comprising: water; humectant; and a stabilized dicalcium phosphate dihydrate; said stabilized dicalcium phosphate dihydrate being produced by a method which comprises first reacting a dilute solution of orthophosphoric acid with milk of lime t oproduce a reaction mixture having a pH between about 5 and the neutralization point, then adding about 0.4–0.8% by weight of a polyphosphoric acid having at least 40% by weight pyrophosphoric acid, then completing the neutralization of the reaction mixture with the addition of milk of lime until a pH of about 6.9–7.2 is reached, removing and drying the dicalcium phosphate dihydrate formed from the reaction mixture, then admixing an effective, stabilizing amount of finely divided calcium-sodium pyrophosphate with the pyrophosphoric acid-modified dicalcium phosphate dihydrate to produce said stabilized dicalcium phosphate dihydrate product, and recovering a stabilized improved dicalcium phosphate dihydrate product.

2. A stable dentifrice composition comprising: stabilized dicalcium phosphate dihydrate produced by a method which comprises first reacting a dilute solution of orthophosphoric acid with milk of lime to produce a reaction mixture having a pH of about 5–6.5, then adding about 0.40–0.8% by weight of a polyphosphoric acid having at least 40% by weight pyrophosphoric acid, then completing the neutralization of the reaction mixture with the addition of milk of lime until a pH of about 6.9–7.2 is reached, removing and drying the dicalcium phosphate dihydrate formed from the reaction mixture, then admixing about 0.6–1.2% by weight of finely divided calcium-sodium pyrophosphate with the pyrophosphoric acid-modified dicalcium phosphate dihydrate to produce said stabilized dicalcium phosphate dihydrate product, and recovering a stabilized improved dicalcium phosphate dihydrate product; water; and humectant from the group consisting of glycerin and sorbitol.

References Cited by the Examiner

UNITED STATES PATENTS 2,287,699  6/42  Moss et al. _____ 167—93

LEWIS GOTTS, *Primary Examiner.*

M. O. WOLK, IRVING MARCUS, *Examiners.*